Figure 2:
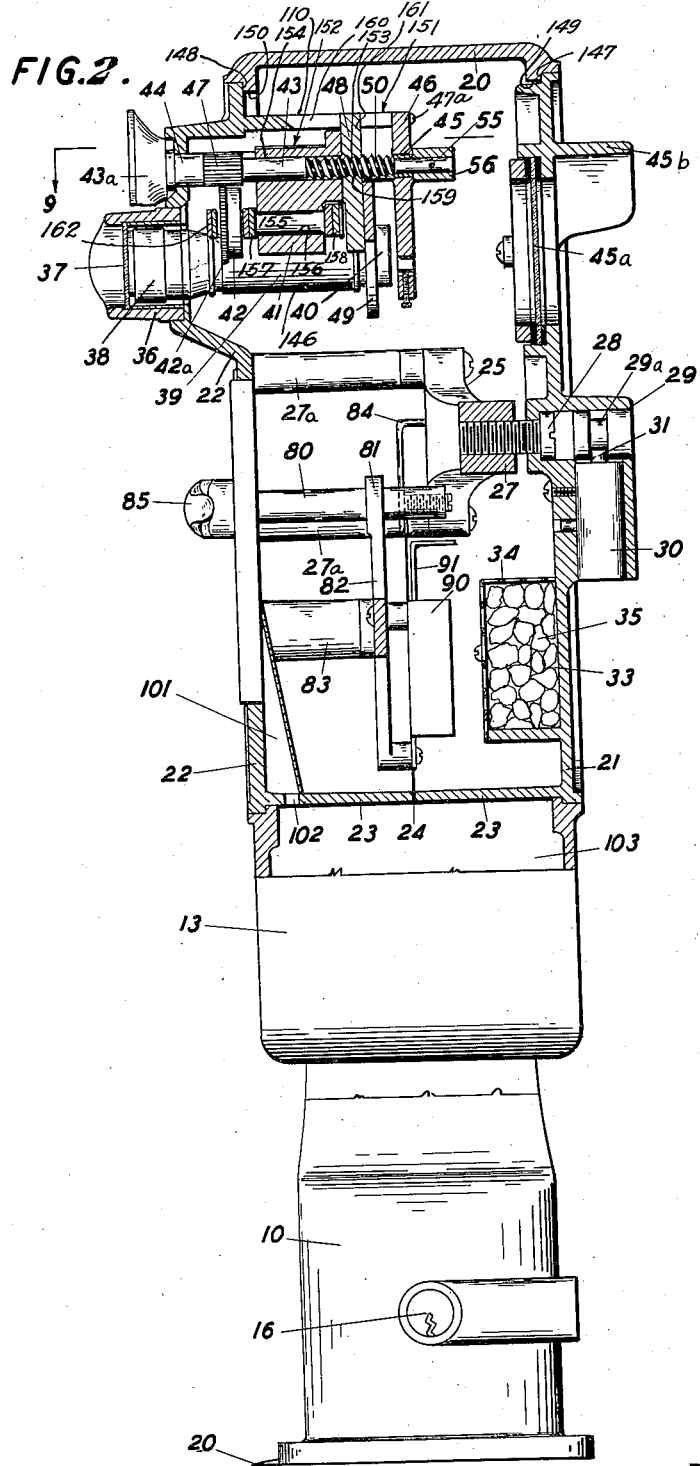

Sept. 27, 1938.  A. F. CASEY  2,131,163
COIN CONTROLLED BINOCULARS
Filed Jan. 31, 1934   2 Sheets-Sheet 1
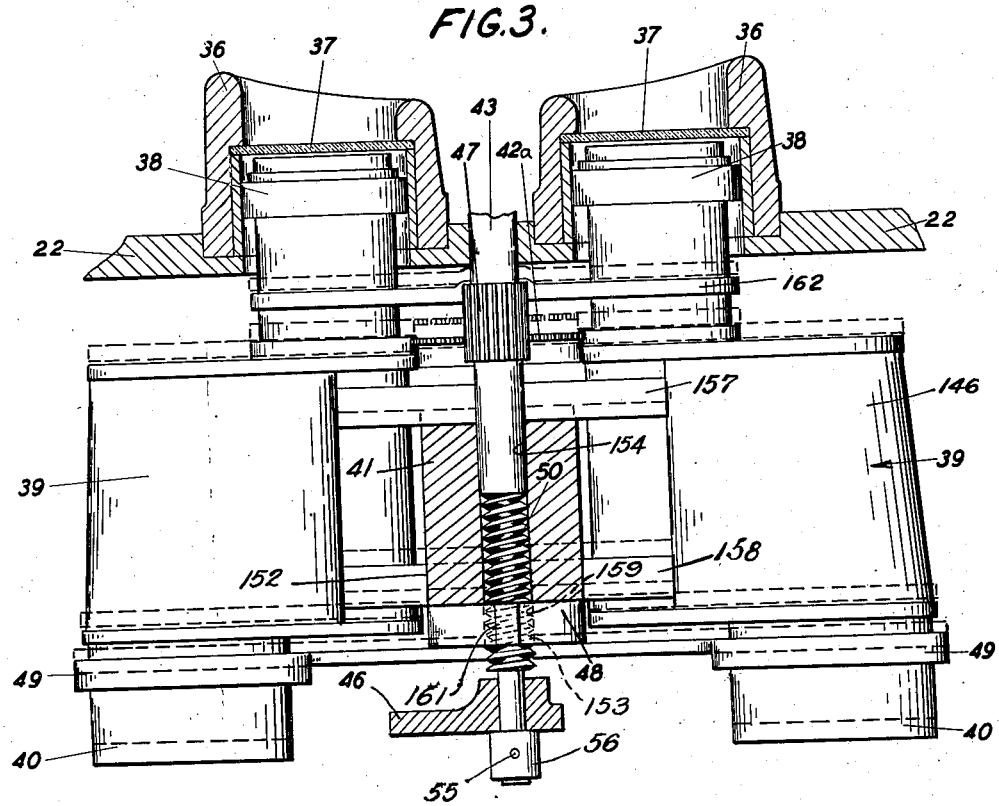
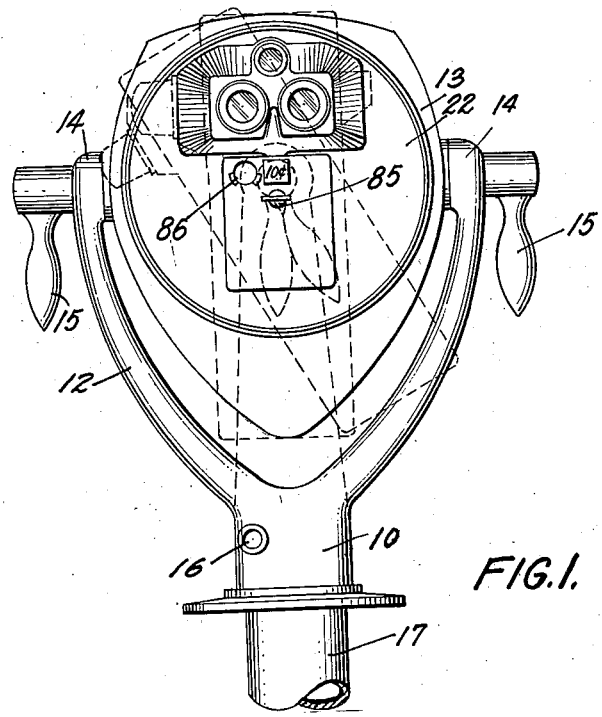
INVENTOR
Arthur F. Casey
BY
A. H. Golden
ATTORNEY Sept. 27, 1938.                A. F. CASEY                 2,131,163
                         COIN CONTROLLED BINOCULARS
                           Filed Jan. 31, 1934            2 Sheets-Sheet 2

INVENTOR
Arthur F. Casey
BY
H. H. Golden
ATTORNEY

Patented Sept. 27, 1938

2,131,163

UNITED STATES PATENT OFFICE 2,131,163

COIN CONTROLLED BINOCULARS

Arthur F. Casey, South Norwalk, Conn., assignor to The Tower Optical Company, Inc., Norwalk, Conn., a corporation of Connecticut Application January 31, 1934, Serial No. 709,091

5 Claims. (Cl. 88—34)

This invention relates to coin controlled optical mechanism, and more especially to coin controlled binoculars mounted in a universaly movable housing.

More especially, my invention relates to a method of mounting the binoculars within the housing, and the arrangement of adjusting means for the binoculars whereby they may be firmly held within the housing and accurately positioned for movement therein.

In devices of this type it is essential that the binoculars be protected from surreptitious molestation. To this end there have been provided housings of various types in which to enclose the binoculars. Because of this fact it has been necessary to provide means on the outside of the housing or casing for adjusting the focus of the binoculars to fit the eyes of the various persons using them and to permit the observation of objects at various distances. It has been found desirable to so mount the binoculars in the casing that eye pieces will remain stationary during the adjusting operation while the objective lens carrying portions of the binoculars are moved. This latter requirement is important in that, although the binocular instrument is completely enclosed in the housing, the eye lens are always maintained at a point at which they will be in proper focus for a person using the instrument.

In practice it has been found that the usual adjusting means with which standard binoculars are provided for moving the eye lens carrying tubes inwardly and outwardly with respect to the main body portions of the binoculars is not sturdy enough to stand up under the strain imposed on it in moving the heavier main body portions. It is, therefore, an important object and feature of this invention to provide a special supporting means which enables the use of binoculars having the usual adjusting means without placing any undue strain thereon.

In some forms of coin operated binocular devices heretofore proposed it was necessary to rigidly secure the eye pieces of the binoculars to the casing, with attendant danger of breaking expensive lens during such securing or from shrinking or warping of the casing. It is, therefore, a still further object of the invention to provide a casing or housing for the binoculars that has means for securely mounting the binoculars without rigidly fixing the eye pieces to the housing.

A primary feature of the invention resides in providing a movable support for the binoculars secured to the main body portions carrying the objective lenses and which is movable by a means which also actuates the usual binocular adjusting mechanism.

A still further and important feature of the invention is the provision of a supporting and operating mechanism adapted to make possible the use of standard high quality binoculars within coin controlled mechanisms and yet adjust the same satisfactorily from outside the casing of such mechanism.

Another feature of the invention resides in providing a casing with circumferential flanges defining front and rear openings and in the sealing of the casing with front and rear plates which are held firmly in contact with the flanges by means of a connecting screw, one of the plates supporting the binoculars.

Other and more specific features of the invention residing in advantageous forms, combinations and relations of parts will hereinafter appear.

In the drawings, Fig. 1 is an elevation of my device illustrating the eye portion of the machine and showing its universal mounting.

Fig. 2 is a partial section and elevation of the machine showing the arrangement of the internal mechanism. Fig. 3 is a partial section and plan view showing the supporting and adjusting mechanism for binoculars.

Referring now more particularly to the drawings which show the present preferred embodiment of the invention, reference numeral 10 represents the mounting stand having a pair of arms 11 and 12 on which the optical housing 13 is journaled at points 14 for rotary movement as may be determined by the pair of handle members 15 which are operable as will be readily apparent to those skilled in the art. The standard 10 carries a lock 16 whereby the standard 10 may be locked onto the mounting post 17.

Because of this mounting of the casing 13 on the pivots 14, and the mounting in turn of the member 10 carrying the pivots 14, on the mounting post 17, it is readily seen that the housing 13 will be movable in a universal manner as is illustrated in dotted lines in Fig. 1.

The housing 13 which is pear shaped is illustrated as having a main frame 20 which has circumferential flanges 147 and 148 defining front and rear openings 149 and 150 respectively, and with which cooperate a front plate member 21 and a rear or eye plate member 22. Both the front and rear plate members are naturally circular in form and each has horizontal flanges 23 which abut at the points 24 to form a tight joint, and in effect, a circular portion separated from the peak of the pear shaped casing. The rear plate member also carries a cast structural member 25 supported by brackets 26 at either end, these brackets being screwed into the rear plate on stud members 27a best shown in Fig. 2. The structural member 25 has at its center a screw threaded portion 27 with which cooperates a screw 28 adapted to traverse the front member 21 and to be screw threaded into the portion 27. It will be quite obvious that this screw threaded member 28 will be adapted to hold both the front and rear plates together, with flanges 23 abutting at point 24 so that the two will be in tight relationship to the outer circular frame 20 of the housing 13. For preventing access to the screw 28 for separating the plate members, I utilize a plug member 29 which is held in locked position by a lock cylinder 30 of any usual type and which must be key actuated to remove the pin 31 from the groove 29a in the plug member 29 so that member 29 may be moved outwardly and access had to the screw 28.

The front plate 21 also has cast integrally therewith a chamber 33 having a series of vent holes 34 and adapted to contain calcium chloride 35 or some other moisture absorbing salt, so that the binocular lenses will be kept clear of any moisture which may collect in the instrument. And this plate is likewise provided with a pair of visual openings each having sun shields 45b projecting outwardly therefrom and each being closed by a glass 45a.

The rear plate 22 has eye shade or tube members 36 equipped with protective glass 37 just beyond which are the eye lens carrying portions 38 of the binoculars 39. The eye lenses located in the portions 38 are placed as closely as is possible to the glass 37 for reasons which will be appreciated by those skilled in the art. And preferably, as shown clearly in Fig. 2, a slight clearance is provided between the eye lens carrying portions 38 and the tube members 36 in which they are inserted. This loose mounting of the portion 38 is advantageous in that it prevents strain on the binoculars during the adjusting operations to be hereinafter described in detail. The objective lenses of the binoculars 39 are located in the carrying tubes 40 which are fixed to the main body portions 146 of the binoculars and are movable therewith relatively to the eye lens carrying portions by the usual objective lens adjusting screw member 42, which is present in all commercial types of binoculars, as for example disclosed in U. S. Patent No. 1,479,409.

For operating the adjusting member 42, there is provided an adjusting shaft 43 which is mounted in a bearing 44 in an extension of the plate 22, and is mounted rearwardly in a bearing 45 in a plate 46 which is secured by a series of screws 47a to a supporting structure 151 integral with the plate 22. Longitudinal movement of the shaft 43 out of the housing is prevented by a collar 56 abutting the plate 46 and fixed to the shaft by a pin 55. This member 43 has gear teeth 47 thereon which mesh with gear teeth 42a on the adjusting member 42. There is a knob 43a on the shaft 43, overlying the outer face of the rear plate 22 above and between the tube members 36, whereby it may be rotated from the outside of the casing and thereby contribute adjusting movement to the binocular adjusting mechanism 42. The knob 43a further serves to prevent movement of the shaft 43 into the housing.

For supporting the binoculars 39 through the intermediary of objective lens portions which comprise the major portion of the binoculars, I provide a member 48 fixed to a block 41. These two elements together form a main movable support 152 carried on the shaft 43 which passes through aligned bores 153 and 154 in the member 48 and the block 41 respectively. The binoculars may be secured to the block 41 in any suitable manner, for example, as shown in Fig. 2, by holding the pivot member or sleeve 155 of the binoculars thereto in a bore 156 therein between the two pairs of connecting arms 157 and 158 similar to the arms shown in U. S. Patent No. 1,479,409, which pivotally connect the main body portions 146 of the binoculars to the pivot sleeve 155, and serve with the pair of arms 162 connecting the eye lens carrying portions to hold the binocular telescopes together as a unit. A bearing extension 49 which encircles the tubes 40 of the objective lens serves also to support the binoculars. The shaft 43 is screw threaded at 50, and is cooperable with screw threads 159 formed in the bore 153 of the supporting member 48 so that as the adjuster 43 is rotated to adjust the objective lenses relatively to the eye lenses through member 42, it also moves the supporting bearing member 48 and the portions 49.

Referring now more particularly to Fig. 3, it will be noted that the eye lens portions 38 are really inserted into the tube or shade members 36 and are therein supported against lateral movement. It will be noticed, however, that there are no means provided between the tubes and the eye lens portions for fixedly holding the portions 38 against outward movement from the tubes 36 as is general in this art. By the rather unusual mechanism which I have provided for operating and supporting the binoculars, it is unnecessary to provide a means within the tubes 36 for maintaining the binoculars therein against axial movement. It will be readily appreciated that when the adjusting shaft 43 through the gear 47 operates the gear member 42a of the adjusting member 42, it will act to separate the eye and objective lens portions. At the same time, the threaded portion 50 of the adjusting shaft 43 will tend to move the objective lens portions axially through its screw threaded relation with the support 48 of the binoculars. There will thus be a double operation of the objective lenses, both through the regular adjusting mechanism 42 and through the bearing 48, the gear and screw ratios being, of course, properly adjusted. This same action is effective upon rotation of the adjusting shaft 43 in an opposite direction to bring together the eye and objective lens portions. Through this relationship, the eye portions 38 always remain stationary while the objective lens portions move relatively to the eye portions 38 through their double operating relation with the shaft 43.

Preferably and as shown in order to guide the movable support and to minimize lateral strain on the binoculars during the rotation of the shaft 43, a longitudinal slot 160 is provided in the supporting structure 151 into which extends an upstanding key 161 formed on the member 48. This serves as a guide means for preventing lateral movement of the support and thus insures longitudinal movement of the binocular body and objective lens carrying portions 40, and relieves the instrument from lateral strain during the adjusting operations.

In Fig. 3 I show in full lines an original position of the binoculars 39, its objective lens carrying portions 40, the bearing support 49 for the portions 40, the part 48 carrying the bearing support 49, and the shaft 43 carrying the screw threaded portion 50 which operates the supporting member 48 at the same time that the gear teeth 47 on the shaft operate the usual binocular adjusting shaft 42 through gear teeth 42a It will thus be quite obvious that in my assembly, the binoculars are supported with the eye lenses in fixed relation to the casing and with the objective lenses movable relatively to the casing and relatively to the eye lenses. It will be obvious also, that I utilize a single primary adjusting shaft for causing relative movement between the objective lenses and the eye lenses, and for simultaneously adjusting a supporting portion so that it will support and move the objective lens carrying portions of the binoculars during adjusting movement.

While binoculars and other optical devices have been variously mounted in the prior art machines, I believe that my arrangement of an adjusting shaft adapted to move the binocular lenses and their supporting bearing simultaneously is a distinct contribution to the art, and might readily be utilized in many mechanical arrangements other than that disclosed herein.

I claim:

1. In a coin controlled optical mechanism, a housing, a binocular mechanism in said housing having relatively movable eye and objective lens carrying portions and a screw adjusting means for moving said portions relative to each other, a movable support for said binocular mechanism fixed to said objective lens portion and slidable therewith, an adjusting and supporting shaft extending into said housing and having a connection to operate said screw adjusting means to move the objective lens carrying portions relatively to said eye lens carrying portions, and means between said shaft and said movable support whereby rotation of said adjusting and supporting shaft moves said support at the same speed as the movement simultaneously transmitted to said objective lens carrying portions by the screw adjusting means.

2. In a coin controlled optical mechanism, a housing, a pair of standard binoculars in said housing having relatively moving eye and objective lens carrying portions and an adjusting screw means for moving said portions relatively to each other, a rotatable adjusting and supporting shaft having an operating knob on the outside of said housing and a portion on the inside of said housing, a movable support carried by said shaft, having a screw threaded connection therewith for movement longitudinally thereon and secured to said objective lens carrying portions to support said binoculars, whereby the objective lens carrying portions are supported by said shaft and movable longitudinally thereof and thereby, and a gear connection between said adjusting and supporting shaft and said adjusting screw means whereby said adjusting screw and said support moving shaft will be moved simultaneously.

3. In a coin controlled optical mechanism, a housing; a rear plate on said housing; sight tubes in said plate; a pair of binoculars in said housing, having relatively movable eye and objective lens carrying portions and having a rotatable adjusting screw means for causing relative movement between said portions, said eye lens portions being supported in said sight tubes; a rotatable adjusting and supporting shaft supported in said housing; a movable support connected to said objective lens carrying portions carried on and movable longitudinally of said shaft; a screw connection between said shaft and said support for causing movement of the latter upon rotation of the shaft; an operating knob outside of said housing for rotating said shaft; and a connection between said shaft and said adjusting means for causing a concurrent rotation thereof to cause relative movement between said eye and objective lens carrying portions simultaneously with the movement of the support.

4. In a device of the character described, a housing; a pair of binoculars in said housing, having relatively movable eye and objective lens carrying portions and an adjusting screw means for moving said portions relative to each other; a rotatable adjusting and suporting shaft in said housing, having an operating means exterior said housing; a support connected to said objective lens carrying portions and carried on and screw actuated by said shaft to be moved longitudinally thereof; and a connection between said shaft and said adjusting screw means for causing relative movement between objective and eye lens carrying portions simultaneously with and at the same rate as the movement of the support on the shaft.

5. In a device of the character described, a housing; a pair of binoculars in said housing, having telescoping relatively movable eye and objective lens carrying portions and an adjusting screw means for moving said portions relatively to each other; a rotatable adjusting and supporting shaft in said housing, having an operating means exterior of the housing; a movable support, connected to said objective lens carrying portions to thereby support said binoculars, and carried on and screw actuated by said shaft to be moved longitudinally thereof; guide means for restraining lateral movement of said support during its longitudinal movement on said shaft; and a connection between said rotatable adjusting shaft and said adjusting screw means for causing relative movement of said eye and objective lens carrying portions simultaneously with the longitudinal movement of said support.

ARTHUR F. CASEY.